R. Walker,
Spoke Gage.
N° 51,765. Patented Dec. 26, 1865.
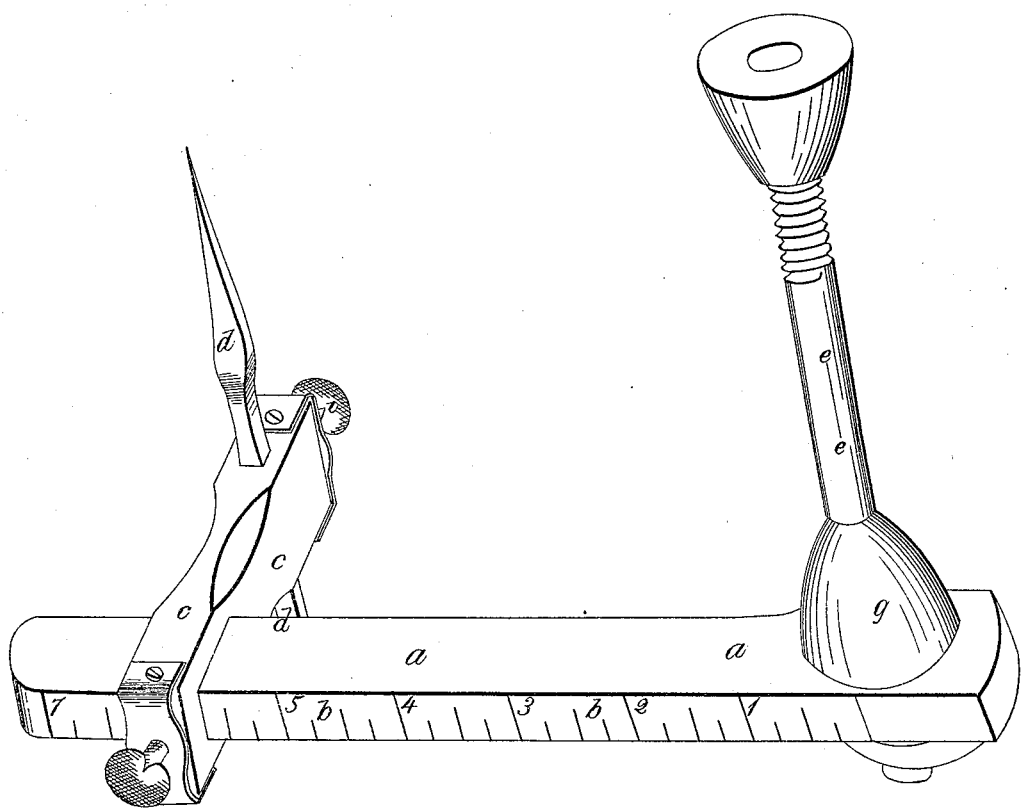
Witnesses:
H. U. Soper
C. A. Hull
Inventor:
Richard Walker

UNITED STATES PATENT OFFICE.

RICHARD WALKER, OF BATAVIA, NEW YORK.

IMPROVEMENT IN MACHINES FOR SETTING SPOKES IN WAGON-WHEELS.

Specification forming part of Letters Patent No. 51,765, dated December 26, 1865.

*To all whom it may concern:*

Be it known that I, RICHARD WALKER, of Batavia, Genesee county, New York, have invented a new and Improved Gage for Adjusting the Spokes of a Wheel; and I do hereby declare that the following is a full and exact description thereof, reference being had to the accompanying drawings, and to the letters of reference thereon.

To enable others to make and use my invention, I will proceed to describe its construction and operation.

The gage may be made principally of wood or of iron. The rod $a\ a$, I make of wood, about one inch wide and one-half of an inch thick and about two and one-half feet long, or sufficiently long to allow of a measure or rule to be attached thereto, letter $b\ b$, which will be equal to the semi-diameter of ordinary wheels in use, and this rule may be attached or the same may be marked on the rod in inches and parts of inches and feet. Near one end thereof I insert through the widest side perpendicular thereto a standard held by a nut loosely, so that the rod $a\ a$ may revolve, and a conical nut is placed upon said standard, firmly attached, with the base of the cone resting against the inside of the said rod $a\ a$, and upon the opposite end of said standard $e\ e$ a similar conical nut, $f$, is attatched by means of a screw so arranged and made that the distance between the two conical nuts $f\ g$, may be regulated to the size of the hub of the wheel. This standard $e\ e$ is inserted into the hub of the wheel, and is held there firmly by means of the two conical nuts $f\ g$, which fit into any sized hub, and always bring the standard $e\ e$, to which the gage-rod $a\ a$ is attached to the center thereof. The gage-rod has a sliding bar, $c\ c$, attached to its outer end to be held firmly in the desired position by the set-screw $h$, and in the outer end a flexible spindle, $d\ d$, is inserted, which is held in any desired position by the set-screw $i$. Its operation is as follows: The standard $e\ e$ is inserted into the hub $b$ after taking off the outer conical nut, $f$, and the nut is then attached and screwed up firmly. The slide $c\ c$ is then set to the desired size of the wheel, and the spindle $d\ d$ is set to the desired dish of the wheel, and in its revolution will mark upon the spokes the desired size of the wheel and its proper or desired dishing. The spindle is made flexible, so that it may yield to the pressure of the spokes in case they should happen to be driven inaccurately, so as to produce the requisite dishing.

Having thus described my invention, I claim as follows:

Making an adjustable gage for setting the spokes and regulating the size of wheels in the manner herein described and particularly set forth, and for the purpose described.

RICHARD WALKER.

Witnesses:
    H. U. SOPER,
    C. A. HULL.